United States Patent
Maloney

(10) Patent No.: US 7,594,788 B2
(45) Date of Patent: Sep. 29, 2009

(54) CLINCH/BROACH CONNECTOR

(75) Inventor: Michael J Maloney, Doylestown, PA (US)

(73) Assignee: PEM Management, Inc., Wilmington, DE (US)

( * ) Notice: Subject to any disclaimer, the term of this patent is extended or adjusted under 35 U.S.C. 154(b) by 309 days.

(21) Appl. No.: 11/306,840

(22) Filed: Jan. 12, 2006

(65) Prior Publication Data

US 2006/0177285 A1    Aug. 10, 2006

Related U.S. Application Data

(60) Provisional application No. 60/650,519, filed on Feb. 8, 2005.

(51) Int. Cl.
*F16B 19/06* (2006.01)
(52) U.S. Cl. .................. 411/180; 411/500; 411/501
(58) Field of Classification Search .................. 411/501, 411/180, 181, 188, 178, 500, 504
See application file for complete search history.

(56) References Cited

U.S. PATENT DOCUMENTS

| | | | |
|---|---|---|---|
| 799,924 | A | 9/1905 | Murphy |
| 3,242,962 | A | 3/1966 | Dupree |
| 4,138,921 | A | 2/1979 | McGauran et al. |
| 4,202,243 | A | 5/1980 | Leonhardt |
| 5,256,019 | A | 10/1993 | Phillips, II |
| 2002/0131842 | A1 | 9/2002 | Eriksson |

*Primary Examiner*—Gary Estremsky
(74) *Attorney, Agent, or Firm*—Gregory J. Gore

(57) ABSTRACT

A connector insert is installed into two panels, one non-metallic and one metal, effectively locking them together and finishing flush with the surfaces of each panel. Both sheets have aligned apertures through which the connector is installed. The connector is a clinch-type fastener including a shank having a displacer head at one end and an endface at the opposite end, the head having a planar top surface and being the largest diameter of the fastener. An undercut groove is located on the shank immediately below the head and a plurality of axially-extending broaching teeth on the shank are located immediately below the undercut groove. The diameter of the broaching teeth is greater than the diameter of the undercut groove but less than the diameter of the head. At the end of the shank is a planar endface immediately below the broaching portion.

7 Claims, 2 Drawing Sheets

CLINCH/BROACH CONNECTOR

RELATED APPLICATIONS

The present patent application is related to U.S. Provisional Patent Application Ser. No. 60/650,519 filed Feb. 8, 2005 entitled "Clinch/Broach Connector," priority from which is hereby claimed.

FIELD OF THE INVENTION

The present invention relates to non-deformable fasteners which are capable of affixing two sheets of material face-to-face. More specifically, it relates to fasteners that pass through aligned apertures in two sheets of material in which the joinder to the fastener is accomplished by the deformation of the sheets.

BACKGROUND OF THE INVENTION

It is known to fasten two sheets together using rivets, however these fasteners have their drawbacks in that they leave an unacceptable aesthetic appearance since they do not leave a finish which is flush with the surface of the sheets. It is known to attach two metal sheets with an insert that provides a flush finish as shown in U.S. Pat. No. 3,242,962 issued to Dupree, however the materials with which the Dupree insert may be used are limited to those capable of cold flow deformation when the insert is applied under high pressure. The Dupree fastener can only be installed between the sheets being joined as well. The clinch/broach fastener installs from the top sheet of the two from the outside, permitting the installation of more than one in any array of parts. There is therefore a need in the art for an insert that can join two sheets which are composed of a wide range of different materials while providing joinder of the sheets with a flush final finish.

SUMMARY OF THE INVENTION

The present invention is a connector insert that can be installed into two panels, one non-metallic and one metal, effectively locking them together and finishing flush with the surfaces of each panel. It attaches the panels much like a rivet and may be utilized as a replacement for rivets which leave a protrusion on the surfaces of the panels where a flush attachment is desired. It also replaces bonding agents such as epoxies which are messy and costly. Thus, the present invention installs flush with the metal and non-metallic surfaces without epoxy mess or rivet protrusion. The present insert can also install into a blind hole in a metal sheet leaving the outsides of the metal sheet completely mar free. A knurl can be added to the metal displacer of the connector causing a non-rotatable connection. Rivets do not provide this anti-rotation feature.

More specifically, the applicant has devised a clinch-type fastener for joining parallel sheets face-to-face having aligned apertures comprising a shank having a displacer head at one end and an endface at the opposite end, the head being a displacer having a planar top surface and being the largest diameter of the fastener. An undercut groove is located on the shank immediately below the head, and a plurality of axially extending broaching teeth on a portion of the shank are located immediately below the undercut groove. The outside diameter of the broaching teeth is greater than the diameter of the undercut groove but less than the diameter of the head. The endface is adjacent to and immediately below the broaching portion of the shank and has a planar bottom surface. The top surface and the endface bottom surface are circular.

An assembly including the fastener joins two sheets in face-to-face contacting relationship further comprising a first metal planar sheet having a first hole therein including sidewalls which occupy substantially all of the first undercut groove of the fastener. A second non-metallic planar sheet is joined in face-to-face relation with the first sheet, the second sheet having a second hole therein of lesser diameter than the first hole in the first sheet and being concentric therewith, the broaching teeth of the fastener being embedded into the sidewall of the second hole. The top surface of the fastener is flush with an outer surface of the first sheet and the bottom surface of the endface is flush with an outer surface of the second sheet.

From the following drawings and description of the preferred embodiment, it will be appreciated by those of skill in the art that the objects of the invention have been achieved. While the present invention will be described with the reference to a specific embodiment, the following description is illustrative of the invention and is not to be construed as limiting the invention. Various modifications to the present invention can be made to the preferred embodiment by those skilled in the art without departing from the true spirit and scope of the invention. It will be noted here that for better understanding like components are designated by the reference numerals throughout the various figures of drawing which follow.

DESCRIPTION OF THE PREFERRED EMBODIMENT

The following drawings depict one or more embodiments of the invention in which the various elements are labeled. In one embodiment, the invention is a short metal stud which includes a displacer and undercut at one end and a broaching portion at the other end. This is shown in the following FIGS. 1-8 wherein the displacer and undercut clinch into the sheets being affixed to one another. FIGS. 1-4 depict the embodiment where the top sheet is metal and the bottom sheet is plastic and the embodiment shown in FIGS. 5-8 show the invention utilized in an application where the top sheet is plastic and the bottom sheet is metal.

Figure 1:
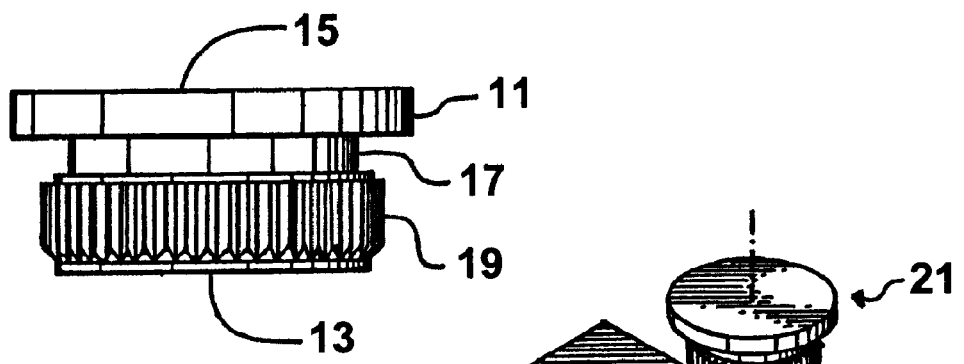
FIG. 1 is a front elevation view of the connector of the present invention.

Referring now to FIG. 1, this embodiment may be utilized where the top sheet is metal and the bottom sheet is composed of a non-metal such as plastic. The insert includes a displacer head 11 at one end and an endface 13 at the opposite end. The displacer head 11 has a planar top surface 15 and is the largest diameter of the insert. An undercut groove 17 on a shank located immediately below the displacer head is of a first diameter. A portion of the shank immediately below the undercut groove 17 includes axially extending broaching teeth 19, the outside diameter of which is greater than the undercut groove 17 but less than the displacer head 11. The insert endface 13 is immediately adjacent the broaching portion of the insert shank and is planar.

Figure 2:
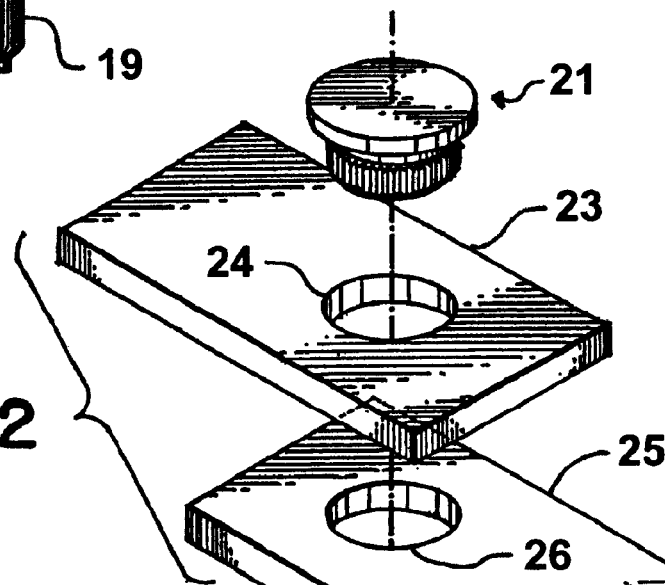
FIG. 2 is a top right front exploded assembly view of the invention installed in two panels.
Figure 3:
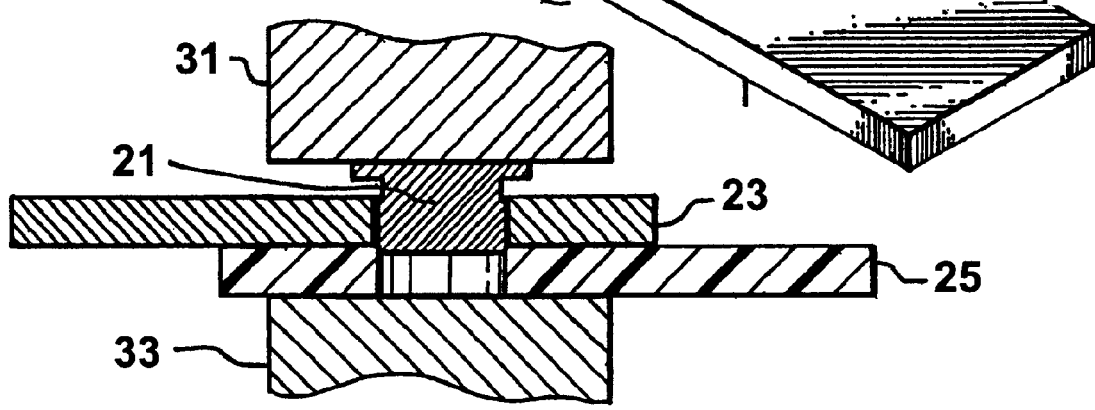
FIGS. 3 and 4 are front elevation sectional views showing a two-step sequence of installation of the invention in one embodiment thereof.
Figure 4:
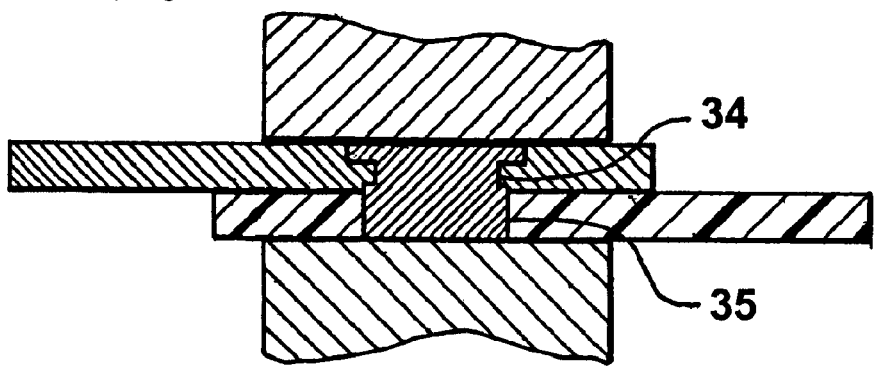

Referring now to FIGS. 2, 3, and 4, the application of the insert 21 to assemble two sheets 23 and 25 is shown. As shown in FIG. 2, the insert is applied to two sheets having aligned circular apertures 24 and 26, hole 24 being of larger diameter than hole 26. Then, as illustrated in FIGS. 3 and 4, the insert is pressed into the two sheets between a movable ram 31 and an anvil 33. As shown in FIG. 4, the insert is forcibly applied and the material of the top sheet 34 flows into the undercut groove while the teeth of the broaching portion of the shank cut into the inner wall 35 of the hole in the second sheet, thus joining both sheets.

Figure 5:
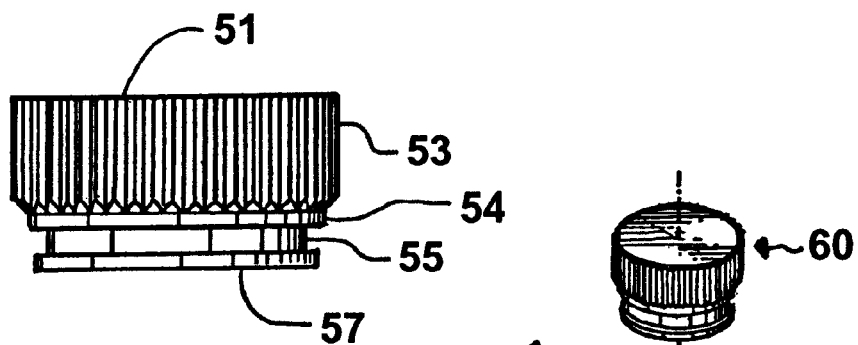
FIG. 5 is a front elevation view of an alternate embodiment.
Figure 6:
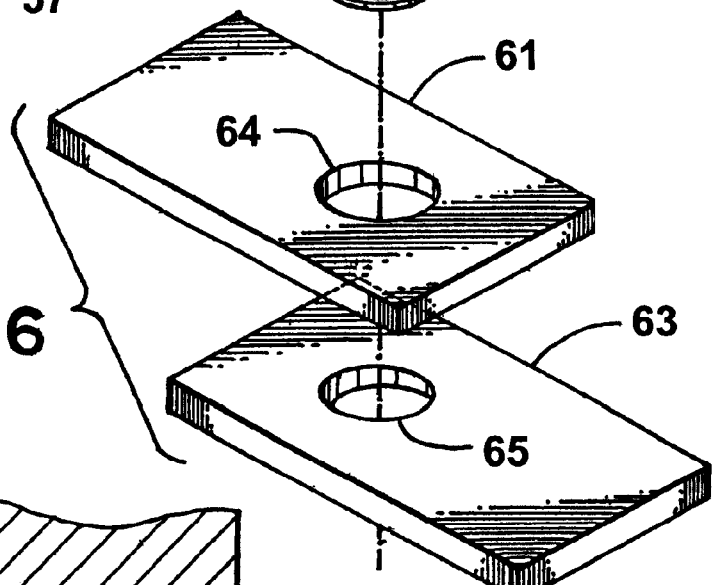
FIG. 6 is a top right front exploded assembly view of an alternate embodiment of the invention installed in two panels.
Figure 7:
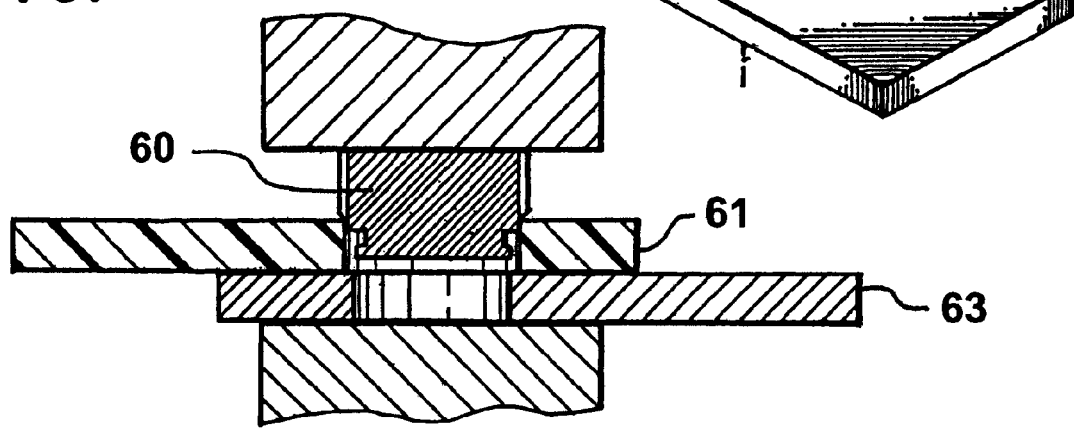
FIGS. 7 and 8 are front elevation sectional views showing a two-step sequence of installation of the invention in an alternate embodiment thereof.
Figure 8:
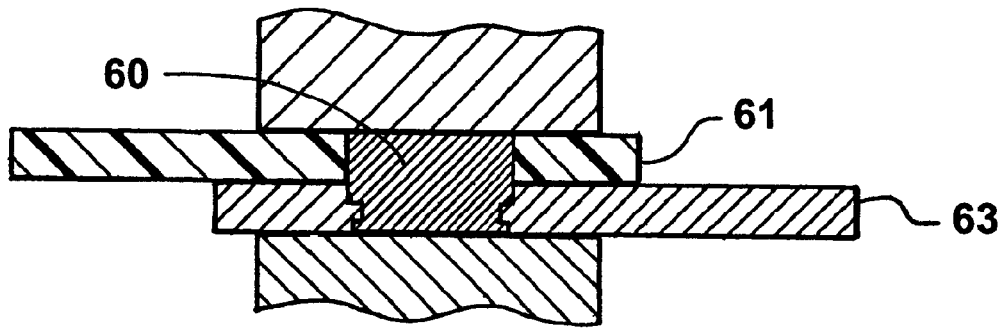

Referring now to FIGS. 5-8, an insert similar to that shown in FIGS. 1-4 is employed except that the attachment features of the insert are reversed in order so that the insert may be used in cases where the top sheet is of a non-cold flow material such as plastic and the second sheet is metal. In this case, the fastener as shown in FIG. 5 includes a topmost portion of the shank having a planar top surface 51 and axially extending broaching teeth 53. This top portion of the shank is the largest diameter of the insert. Immediately adjacent the broaching portion is a displacer 54 and an undercut groove 55 which is followed by an endcap 57 being the least diameter of the insert. Referring now to FIGS. 6, 7, and 8, it will be readily understood by those of the mechanical arts that the application of this embodiment of the insert 60 to sheets 61 and 63 by the high force pressing shown in FIGS. 7 and 8 will achieve the attachment of the two sheets face-to-face with flush final finish in the outer surfaces of the sheets as shown in FIG. 8. This is similar to the assembly process of the first embodiment in FIGS. 3 and 4.

In both embodiments, the top sheet has a larger mounting hole than the lower sheet as shown in FIGS. 2 and 6 allowing the clinching feature of the lower sheet to pass through it. As depicted in FIGS. 3 and 7, both sheets are attached simultaneously with one pressing operation. As shown in FIGS. 4 and 8, the broaching section of one end locks into the non-metal sheet at the same time as the clinch section of the opposite end locks into the metal sheet.

Thus, the object of the invention has been achieved to create an insert that can be installed into two panels, one non-metallic and one metal, effectively locking them together face-to-face while finishing flush with the outside surfaces of each panel. Other advantages and variations on the device described and depicted in the drawings will be apparent to those of skill in the art without departing from the nature and spirit of the invention disclosed. It should be understood that there may be other modifications and changes to the present invention that will be obvious to those of skill in the art from the foregoing description, however, the present invention should be limited only by the following claims and their legal equivalents.

What is claimed is:

1. A unitary clinch-type fastener for joining parallel sheets face-to-face by direct engagement therewith, comprising:
    a shank having a planar top surface at one end and an endcap at the opposite end;
    a plurality of radially pointing broaching teeth located immediately below said top surface, each tooth extending axially along a top portion of said shank;
    a displacer on said shank being a radially extending flange greater in diameter than said end cap and located immediately below said teeth; and
    an undercut groove having opposing side walls substantially parallel to said endcap and being located on said shank immediately below said displacer for receiving a cold flow of material displaced by said displacer.

2. The fastener of claim 1 wherein the endcap is immediately below the undercut groove.

3. The fastener of claim 2 wherein the top surface and the endcap are circular.

4. The fastener of claim 3 wherein said top portion is the largest diameter of the fastener.

5. An assembly including the fastener of claim 1 further comprising:
    two sheets in face-to-face contact joined by direct engagement with a unitary fastener of claim 1;
    a first planar sheet having a first hole therein occupied by the top portion of said fastener wherein said teeth are embedded into side walls of said first hole; and
    a second planar sheet having a second hole therein in axial alignment with said first hole of said first sheet, said second hole including deformed side walls which occupy substantially all of said undercut groove by a cold flow of said second sheet material caused by said displacer.

6. The assembly of claim 5 wherein said second hole is of lesser diameter than said first hole.

7. The assembly of claim 6 wherein the top surface of said fastener is flush with an outer surface of said first sheet and said endcap is flush with an outer surface of said second sheet.

* * * * *